United States Patent
Yamanashi et al.

(10) Patent No.: US 10,242,589 B2
(45) Date of Patent: Mar. 26, 2019

(54) MAKEUP APPLICATION ASSISTANCE DEVICE, MAKEUP APPLICATION ASSISTANCE METHOD, AND MAKEUP APPLICATION ASSISTANCE PROGRAM

(71) Applicant: PANASONIC INTELLECTUAL PROPERTY MANAGEMENT CO., LTD., Osaka (JP)

(72) Inventors: Tomofumi Yamanashi, Kanagawa (JP); Rieko Asai, Osaka (JP); Aoi Muta, Osaka (JP); Chie Nishi, Kanagawa (JP); Kaori Ajiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 233 days.

(21) Appl. No.: 15/010,200

(22) Filed: Jan. 29, 2016

(65) Prior Publication Data
US 2016/0148532 A1    May 26, 2016

Related U.S. Application Data

(63) Continuation of application No. 14/389,018, filed as application No. PCT/JP2014/000310 on Jan. 22, 2014.

(30) Foreign Application Priority Data

Feb. 1, 2013  (JP) ................................. 2013-018279

(51) Int. Cl.
G09B 19/00    (2006.01)
A45D 44/00    (2006.01)
(Continued)

(52) U.S. Cl.
CPC ............. G09B 19/00 (2013.01); A45D 44/00 (2013.01); A45D 44/005 (2013.01);
(Continued)

(58) Field of Classification Search
CPC ............ A45D 44/005; A45D 2044/007; A45D 44/00; G09B 19/0076; G09B 19/00;
(Continued)

(56) References Cited

U.S. PATENT DOCUMENTS

2012/0044335 A1    2/2012  Goto
2012/0223956 A1*   9/2012  Saito .................... A45D 44/005
                                                         345/582
(Continued)

FOREIGN PATENT DOCUMENTS

JP    2001-346627    12/2001
JP    2003-044837     2/2003
(Continued)

OTHER PUBLICATIONS

International Search Report from PCT/JP2014/000310, dated Feb. 25, 2014.
(Continued)

*Primary Examiner* — Robert P Bullington
(74) *Attorney, Agent, or Firm* — Greenblum & Bernstein, P.L.C.

(57) ABSTRACT

A makeup assisting apparatus includes a first image acquirer that acquires a first image which is a captured image of a first face, a first facial part acquirer that acquires an area of a portion of the first face, a second image acquirer that acquires a second image which is a captured image of a second face to which makeup is applied, and a second facial part acquirer that acquires an area of a portion of the second face. A reference makeup acquirer acquires makeup from the second image for each of the portions of the second face,
(Continued)

based on the area of the portion of the second face, the makeup being a way of applying the makeup and a makeup presenter that presents, to a user, the acquired makeup in association with the corresponding area of the portion of the first face.

20 Claims, 11 Drawing Sheets

(51) Int. Cl.
*G06T 11/00* (2006.01)
*G06F 17/22* (2006.01)
*G06K 9/00* (2006.01)
*G06T 11/60* (2006.01)
*G09B 5/02* (2006.01)

(52) U.S. Cl.
CPC ..... *G06F 17/2235* (2013.01); *G06K 9/00248* (2013.01); *G06K 9/00261* (2013.01); *G06T 11/00* (2013.01); *G06T 11/60* (2013.01); *G09B 5/02* (2013.01)

(58) Field of Classification Search
CPC .. G09B 5/02; G06F 17/2235; G06K 9/00248; G06K 9/00261; G06T 11/00; G06T 11/60

USPC .......................................................... 434/100
See application file for complete search history.

(56) References Cited

U.S. PATENT DOCUMENTS

| 2015/0049111 A1 | 2/2015 | Yamanashi et al. |
| 2015/0050624 A1 | 2/2015 | Yamanashi et al. |
| 2015/0086945 A1 | 3/2015 | Yamanashi et al. |

FOREIGN PATENT DOCUMENTS

| JP | 2007-257165 | 10/2007 |
| JP | 2008-257381 | 10/2008 |
| JP | 2010-73008 | 4/2010 |
| JP | 2012-113747 | 6/2012 |
| WO | 2008/102440 | 8/2008 |

OTHER PUBLICATIONS

European Search Report in European Patent Application No. 14746577.7, dated Nov. 3, 2015.
U.S. Appl. No. 15/010,224 to Tomofumi Yamanashi et al., filed Jan. 29, 2016.

* cited by examiner

| | 510 | |
|---|---|---|
| 511 | 512 | 513 |
| FACIAL PART ID | AREA | MAKEUP TYPE |
| P 1 | R 1 | T 1 |
| P 2 | R 2 | T 2 |
| ⋮ | ⋮ | ⋮ |

*FIG. 3*

| | 520 | |
|---|---|---|
| 521 | 522 | 523 |
| MAKEUP TYPE | COLOR | COSMETICS ID |
| T 1 | C 1 | I 1 |
| T 2 | C 2 | I 2 |
| T 3 | C 3 | I 3 |
| T 4 | C 3 | I 4 |
| ⋮ | ⋮ | ⋮ |

| 531 | 532 | 533 |
| --- | --- | --- |
| COSMETICS ID | COMPANY ID | ITEM NUMBER |
| I 1 | B 1 | b 1 1 |
| I 2 | B 1 | b 2 3 |
| ⋮ | ⋮ | ⋮ |

| FACIAL PART ID | COLOR | CONCENTRATION | RANGE |
|---|---|---|---|
| P 1 | C 1 | D 1 | A 1 |
| P 2 | C 2 | D 2 | A 2 |
| P 3 | C 3 | D 3 | A 3 |
| P 4 | C 3 | D 2 | A 4 |
| ⋮ | ⋮ | ⋮ | ⋮ |

FIG. 11

MAKEUP APPLICATION ASSISTANCE DEVICE, MAKEUP APPLICATION ASSISTANCE METHOD, AND MAKEUP APPLICATION ASSISTANCE PROGRAM

CROSS-REFERENCE TO RELATED APPLICATIONS

This application is a continuation application of co-pending U.S. patent application Ser. No. 14/389,018, filed Sep. 29, 2014, which is a National Phase of PCT Patent Application No. PCT/JP2014/000310 having International filing date of Jan. 22, 2014, which is claims priority of Japanese Patent Application No. 2013-018279, filed Feb. 1, 2013, the disclosures of which are expressly incorporated by reference herein.

TECHNICAL FIELD

The present invention relates to a makeup assisting apparatus, a makeup assisting method and a makeup assisting program for assisting facial makeup (cosmetic makeup).

BACKGROUND ART

In recent years, the way of making up the face (hereinafter, simply referred to as "makeup") has been diversified. It takes an enormous amount of time and effort to actually try, judge and compare various types of makeup. For this reason, it is difficult particularly, for a person who has no sufficient knowledge about makeup to select appropriate makeup from countless numbers of options.

To address the above-described problem, techniques of generating and presenting a simulation image which simulates the face to which makeup is applied are disclosed in, for example, PTL 1 to PTL 3. In the techniques disclosed in PTL 1 to PTL 3 (hereinafter, referred to as "related art"), a captured image of the face to which makeup is to be applied (hereinafter, simply referred to as the "face") is acquired. Further, with the related art, the simulation image is generated by superimposing, on the acquired image, an image indicating a state of makeup such as a lipstick and blush when the makeup is applied to the face. With the related art, the generated simulation image is displayed at a display apparatus.

The related art allows a user to judge whether the makeup is good or bad without actually applying the makeup, thus allowing the user to select appropriate makeup with less time and effort.

CITATION LIST

Patent Literature

PTL 1
Japanese Patent Application Laid-Open No. 2001-346627
PTL 2
Japanese Patent Application Laid-Open No. 2003-44837
PTL 3
Japanese Patent Application Laid-Open No. 2012-113747
PTL 4
Japanese Patent Application Laid-Open No. 2007-257165

SUMMARY OF INVENTION

Technical Problem

A person who wears makeup sometimes desires to check whether the makeup of someone else looks nice on herself, for example, when her friend looks very beautiful with makeup, or when seeing an actress or a model who wears novel makeup in a magazine or on TV. With the above-described related art, such checking can be easily made with a simulation image by designating the desired makeup.

However, in order to designate makeup similar to the makeup used by others, the person has to specify details of the makeup (such as color, application concentration and an application range of a skin cosmetic agent), and further perform operation to input information of the specified makeup. Meanwhile, it is difficult to inquire about details of the makeup, particularly, in the case of the makeup applied to an actress or a model. Further, it is difficult to know the details of the makeup used by others, particularly, for a person who has no sufficient knowledge about makeup.

The related art does not take into account assistance for makeup using makeup used by others as a reference.

It is therefore an object of the present invention to provide a makeup assisting apparatus, a makeup assisting method and a makeup assisting program which can appropriately provide assistance for makeup using makeup used by others as a reference.

Solution to Problem

A makeup assisting apparatus according to an aspect of the present invention includes: a first image acquiring section that acquires a first image which is a captured image of a first face; a first facial part acquiring section that acquires an area of a facial part of the first face from the first image; a second image acquiring section that acquires a second image which is a captured image of a second face to which makeup is applied; a second facial part acquiring section that acquires an area of a facial part of the second face from the second image; a reference makeup acquiring section that acquires makeup from the second image for each of the facial parts of the second face based on the area of the facial part of the second face, the makeup being a way of applying the makeup; and a makeup presenting section that presents to a user the acquired makeup in association with the corresponding area of the facial part of the first face.

A makeup assisting method according to an aspect of the present invention includes: acquiring a first image which is a captured image of a first face; acquiring an area of a facial part of the first face from the first image; acquiring a second image which is a captured image of a second face to which makeup is applied; acquiring an area of a facial part of the second face from the second image; acquiring makeup from the second image for each of the facial parts of the second face based on the area of the facial part of the second face, the makeup being a way of applying the makeup; and presenting to a user the acquired makeup in association with the corresponding area of the facial part of the first face.

A makeup assisting program according to an aspect of the present invention is a program causing a computer to execute processing including: acquiring a first image which is a captured image of a first face; acquiring an area of a facial part of the first face from the first image; acquiring a second image which is a captured image of a second face to which makeup is applied; acquiring an area of a facial part of the second face from the second image; acquiring makeup from the second image for each of the facial parts of the second face based on the area of the facial part of the second face, the makeup being a way of applying the makeup; and presenting to a user the acquired makeup in association with the corresponding area of the facial part of the first face.

Advantageous Effects of Invention

According to the present invention, it is possible to appropriately provide assistance for makeup using makeup used by others as a reference.

BRIEF DESCRIPTION OF DRAWINGS

FIG. 3 illustrates an example of a makeup position table in Embodiment 2;

FIG. 4 illustrates an example of a makeup color table in Embodiment 2;

FIG. 5 illustrates an example of a cosmetics table in Embodiment 2;

FIG. 11 illustrates an example of reference makeup information in Embodiment 2.

DESCRIPTION OF EMBODIMENTS

Embodiments of the present invention will be described in detail below with reference to the accompanying drawings.

Embodiment 1

Embodiment 1 of the present invention is an example of a basic mode of the present invention.

Figure 1:
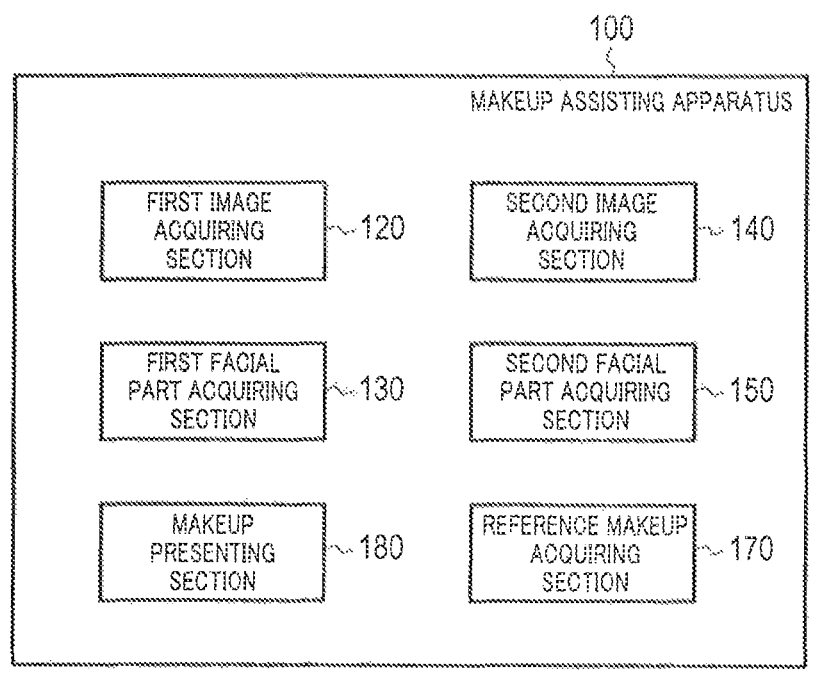
FIG. 1 is a block diagram illustrating an exemplary configuration of a makeup assisting apparatus according to Embodiment 1 of the present invention.

FIG. 1 is a block diagram illustrating an exemplary configuration of a makeup assisting apparatus according to the present embodiment.

In FIG. 1, makeup assisting apparatus 100 includes first image acquiring section 120, first facial part acquiring section 130, second image acquiring section 140, second facial part acquiring section 150, reference makeup acquiring section 170 and makeup presenting section 180.

First image acquiring section 120 acquires a first image which is a captured image of a first face. The first face is a face for which a simulation image of makeup is to be generated.

First facial part acquiring section 130 acquires an area of a facial part of the first face from the first image.

Second image acquiring section 140 acquires a second image which is a captured image of a second face to which makeup has been applied. The second face is, for example, a face of a model in a magazine.

Second facial part acquiring section 150 acquires an area of a facial part of the second face from the second image.

Reference makeup acquiring section 170 acquires makeup which is the way of applying the makeup from the second image based on the area of the facial part of the second face for each facial part of the second face.

Makeup presenting section 180 presents to a user the acquired makeup in association with the corresponding area of the facial part of the first face. The user is, for example, a person who wears the makeup on the first face, such as a person of the first face.

Makeup assisting apparatus 100 has, for example, a central processing unit (CPU), a storage medium such as a read-only memory (ROM) having a control program stored therein, and a working memory such as a random access memory (RAM), which are not illustrated. In this case, the above-described functions of the sections are implemented by the CPU executing the control program.

Makeup assisting apparatus 100 as described above can acquire makeup which has been applied to the second face for each facial part and present to the user the acquired makeup in association with the area of the facial part of the first face. The second face may include, for example, the face of others. Therefore, makeup assisting apparatus 100 can appropriately provide assistance for makeup using makeup used by others as a reference.

Embodiment 2

Embodiment 2 of the present invention is an example of a specific mode of the present invention. The present embodiment is an example in which the present invention is applied to an apparatus provided with a digital camera and a display with a touch panel.

Explanation of Terms

First, terms used in the present embodiment will be described.

A "facial part" refers to a part characterizing impression of the face, such as eyes, eyebrows, nose, cheekbones, lips and an outline.

A "Facial part ID" is identification information of the facial part.

An "area of the facial part" refers to an area occupied by the facial part on an image or in real space, and includes a position of a feature point of the facial part, such as corners of the eyes.

"Makeup" indicates the way (type) of makeup, and includes at least color, application concentration and an application range of a skin cosmetic agent.

"Reference makeup information" is information indicating makeup selected as makeup which the user who receives assistance for makeup should refer to.

"Cosmetics information" is information regarding skin cosmetics for applying the makeup.

A "makeup type" is a type of makeup such as "foundation," "eye shadow," "lipstick" and "blush," which can be distinguished at least by positional relationship with the facial part.

A "cosmetics ID" is identification information of skin cosmetics, and can specify cosmetics information.

<Configuration of Makeup Assisting Apparatus>

Next, a configuration of the makeup assisting apparatus according to the present embodiment will be described.

Figure 2:
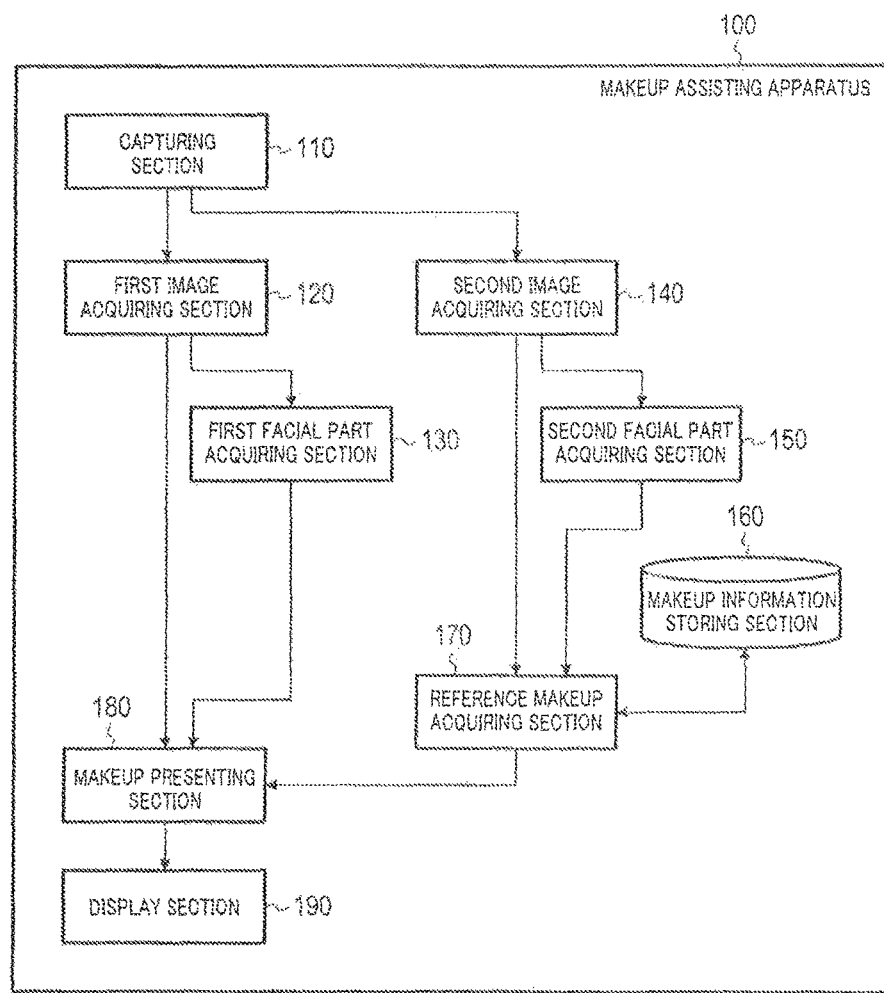
FIG. 2 is a block diagram illustrating an exemplary configuration of a makeup assisting apparatus according to Embodiment 2 of the present invention.

FIG. 2 is a block diagram illustrating an exemplary configuration of the makeup assisting apparatus according to the present embodiment.

In FIG. 2, makeup assisting apparatus 100 includes capturing section 110, first image acquiring section 120, first facial part acquiring section 130, second image acquiring section 140, second facial part acquiring section 150, makeup information storing section 160, reference makeup acquiring section 170, makeup presenting section 180 and display section 190.

Capturing section 110 is a digital still camera, for example, and captures an image.

First image acquiring section 120 captures an image of the face of the user of makeup assisting apparatus 100 (the first face, hereinafter, referred to as the "face of the user") using capturing section 110. First image acquiring section 120 then acquires the captured image of the face of the user (a first image, hereinafter, referred to as a "user image") and outputs the user image to first facial part acquiring section 130 and makeup presenting section 180.

First image acquiring section 120 captures the user image by encouraging the user to capture the image of the face, for example, by displaying a message as "capture an image of the face to which makeup is to be applied" on a display. It is assumed in the present embodiment that the user image is an image of the face of the user captured from the front.

First facial part acquiring section 130 acquires an area of the facial part of the face of the user from the input user image. The area of the facial part is acquired, for example, through matching between each partial area of the user image and a template image of each facial part prepared in advance (see, for example, PTL 2). First facial part acquiring section 130 outputs identification information of the acquired facial parts and information indicating the areas (hereinafter, referred to as "user facial part information") to reference makeup acquiring section 170.

Second image acquiring section 140 captures an image of the face of a model which is used by the user as a reference for makeup (a second face, hereinafter referred to as a "face of the model") using capturing section 110. The image of the face of the model is, for example, a picture in a fashion magazine. Capturing section 110 acquires the captured image of the face of the model (a second image, hereinafter, referred to as a "model image") and outputs the model image to second facial part acquiring section 150 and reference makeup acquiring section 170.

Second image acquiring section 140 captures the model image by encouraging the user to capture the face of the model, for example, by displaying a message as "capture an image of the face of makeup you want to use as a reference" on a display. It is assumed in the present embodiment that the model image is an image obtained by capturing from the front the picture in which the image of the face of the model is captured from the front.

Second facial part acquiring section 150 acquires an area of the facial part of the face of the model from the input model image. The area of the facial part is acquired, for example, through matching between each partial area of the model image and a template image of each facial part prepared in advance (see, for example, PTL 2). Second facial part acquiring section 150 outputs identification information of the acquired facial parts and information indicating the areas (hereinafter, referred to as "model facial part information") to reference makeup acquiring section 170.

Makeup information storing section 160 stores in advance makeup information in which a positional relationship with the area of the facial part and a set of color of makeup and cosmetics information are associated with each other for each makeup type. The makeup information includes, for example, a makeup position table, a makeup color table and a cosmetics table. Further, these pieces of information can be referred to from reference makeup acquiring section 170.

The makeup position table is a table which defines the positional relationship of an application range of makeup with the area of the facial part for each makeup type. This positional relationship is, in other words, a makeup extraction criterion used when reference makeup acquiring section 170 extracts makeup from an image, which will be described later. The makeup color table is a table which describes a cosmetics ID of cosmetics to be proposed for each combination of the makeup type and color of makeup. The cosmetics table is a table which describes details of the cosmetics for each cosmetics ID.

FIG. 3 illustrates an example of the makeup position table.

As illustrated in FIG. 3, makeup position table 510 describes makeup type 513 in association with a combination of facial part ID 511 and area 512.

For example, makeup type 513 of "T2" is associated with a combination of facial part ID 511 of "P2" and area 512 of "R2." This indicates that makeup of makeup type 513 of "T2" is applied to area 512 of "R2" corresponding to the area of facial part ID 511 of "P2."

It is assumed, for example, that "P2" indicates the right eye, and "R2" indicates an area which is adjacent to an upper end of the area of the facial part and which has a width of 1% or less of the length of the face and which is continuous with the same color other than skin color. It is assumed that "T2" which corresponds to "P2" and "R2" indicates eye liner. In this case, if there is an area which is adjacent to the upper end of the area of the right eye and which has a width of 1% or less of the length of the face and which is continuous with the same color other than skin color, the area indicates an area for eye liner.

FIG. 4 illustrates an example of the makeup color table.

As illustrated in FIG. 4, makeup color table 520, for example, describes cosmetics ID 523 for each combination of makeup type 521 and color 522. Makeup type 521 corresponds to makeup type 513 of makeup position table 510.

For example, cosmetics ID 523 of "I2" is associated with a combination of makeup type 521 of "T2" and color 522 of "C2." This indicates that cosmetics of the cosmetics ID of "I2" should be used when color of "C2" is used in makeup of the makeup type of "T2."

FIG. 5 illustrates an example of the cosmetics table.

As illustrated in FIG. 5, cosmetics table 530 describes company ID 532 and item number 533 for each cosmetics ID 531. Cosmetics ID 531 corresponds to cosmetics ID 523 of makeup color table 520. Company ID 532 is a name or an identifier of the company which manufactures or sells the skin cosmetics. Item number 533 is an item number of the skin cosmetics.

For example, company ID 532 of "B1" and item number 533 of "b23" are associated with cosmetics ID 531 of "I2." This indicates that the cosmetics ID of "I2" is skin cosmetics of the item number of "b23" of the company indicated by the company ID of "B1."

In makeup assisting apparatus 100, makeup color table 520 illustrated in FIG. 4 and cosmetics table 530 illustrated in FIG. 5 may be integrated into one table.

Reference makeup acquiring section 170 in FIG. 2 acquires makeup applied to the face of the model from the model image based on the area of the facial part of the face of the model for each facial part of the face of the model. More specifically, reference makeup acquiring section 170 detects whether or not there is an area to which makeup has been applied for each facial part based on the extraction criterion defined in makeup position table 510 (see FIG. 3). If there is an area to which makeup has been applied, reference makeup acquiring section 170 acquires the area as an application range of the makeup. Further, reference makeup acquiring section 170 acquires color and application concentration of the makeup applied to the area from the model image. Acquisition of makeup will be described in detail later.

Further, reference makeup acquiring section 170 acquires cosmetics information on the cosmetics required for applying the acquired makeup. The cosmetics information is acquired, for example, using cosmetics table 530 (see FIG. 5) stored in makeup information storing section 160.

Reference makeup acquiring section 170 outputs reference makeup information indicating the acquired makeup and the acquired cosmetics information to makeup presenting section 180. In the present embodiment, the reference makeup information includes at least information required for generating from the image of the face an image in which makeup has been applied to the face.

Makeup presenting section 180 presents to the user makeup indicated in the reference makeup information in association with the corresponding area of the facial part of the face of the user. More specifically, makeup presenting section 180 generates a simulation image based on the input user image and reference makeup information, and outputs the generated simulation image to display section 190. Here, the simulation image is an image obtained by superimposing an image in which the makeup indicated by the reference makeup information (makeup acquired from the model image) has been applied, on the input (captured) user image.

It should be noted that the image is superimposed by, for example, a publicly-known image combining process such as alpha (a) blending process. In this case, an alpha value ($\alpha$) is set according to concentration of makeup. The alpha blending process is expressed with, for example, the following Equations 1 to 3:

[1]

$$R = r_2 \times \alpha + r_1 \times (1-\alpha) \quad \text{(Equation 1)}$$

[2]

$$G = g_2 \times \alpha + g_1 \times (1-\alpha) \quad \text{(Equation 2)}$$

[3]

$$B = b_2 \times \alpha + b_1 \times (1-\alpha) \quad \text{(Equation 3)}$$

where $r_1$, $g_1$ and $b_1$ are RGB values of an arbitrary area in the captured image, $r_2$, $g_2$ and $b_2$ are RGB values of colors of makeup, and R, G and B are RGB values of the corresponding area in the simulation image.

Further, it is assumed that an order of application when makeup is applied in an overlapped manner (hereinafter, referred to as an "application order") is set for each makeup, and an image in which the makeup has been applied is presented as a shaded image with different density according to the concentration. The application order defines, for example, blush should be applied after foundation is applied. In this case, the images may be superimposed on the captured image by overpainting the image of each makeup in an order according to the application order.

Makeup presenting section 180 further presents the input cosmetics information. More specifically, makeup presenting section 180 superimposes or adds an image or text indicating the input cosmetics information on or to the above-described simulation image.

Display section 190 which is, for example, a display, displays (presents) the input simulation image and cosmetics information to the user of makeup assisting apparatus 100.

It should be noted that makeup assisting apparatus 100 includes, for example, a CPU, a storage medium such as a ROM having a control program stored therein, and a working memory such as a RAM, which are not illustrated. In this case, functions of the above-described sections are realized by the CPU executing the control program.

<Acquisition of Makeup from Image>

A method for acquiring makeup from an image, for example, includes the following method.

Reference makeup acquiring section 170 first specifies an area having color approximate to color of the skin of the face of the model, such as ears and neck, from the position of the area of the facial part. Reference makeup acquiring section 170 estimates color distribution of the skin based on the color of the specified area, distribution of shade estimated from the position of the facial parts, distribution of color for each facial part estimated from the type (such as lips) of the facial part, and the like. Reference makeup acquiring section 170 calculates a difference between the estimated color of the skin and actual color in the image for each of the divided areas obtained by minutely dividing the facial area. Reference makeup acquiring section 170 determines a divided area for which the calculated difference is a predetermined threshold or greater as an area to which makeup has been applied (hereinafter, referred to as an "applied divided area").

If there are a plurality of applied divided areas which are continuous and whose color is approximate to each other among the determined applied divided areas, reference makeup acquiring section 170 extracts the plurality of applied divided areas as one area to which the same type of makeup has been applied (hereinafter, referred to as a "continuous applied area"). Reference makeup acquiring section 170 determines whether or not the area matches any of the extraction criteria defined in makeup position table 510 (see FIG. 3) for each of the extracted continuous applied areas. Reference makeup acquiring section 170 then acquires a continuous applied area which matches the extraction criterion as an application range of the makeup, and acquires color and application concentration of the makeup from color of the area in the image and color of the skin estimated for the corresponding area.

The color and application concentration of the makeup is acquired, for example, by performing a process reverse to the above-described alpha blending process. That is, the above-described RGB value is set as color of the image, $r_1$, $g_1$ and $b_1$ are set as color of the skin, and $r_2$, $g_2$ and $b_2$ corresponding to color of makeup and $\alpha$ corresponding to concentration of makeup are calculated using Equations 1 to 3. However, because there are three equations for four variables, it is necessary to presume any one of these four variables (for example, set alpha as a default value for each cosmetic) or perform operation for a plurality of image positions to obtain a set of most probable values.

Makeup assisting apparatus 100 having the above-described configuration can acquire makeup applied to the face of others for each facial part from a captured image of the face, and present to the user the acquired makeup in association with the area of the facial part of the face of the user.

<Operation of Makeup Assisting Apparatus>

Next, operation of makeup assisting apparatus 100 will be described.

Figure 6:
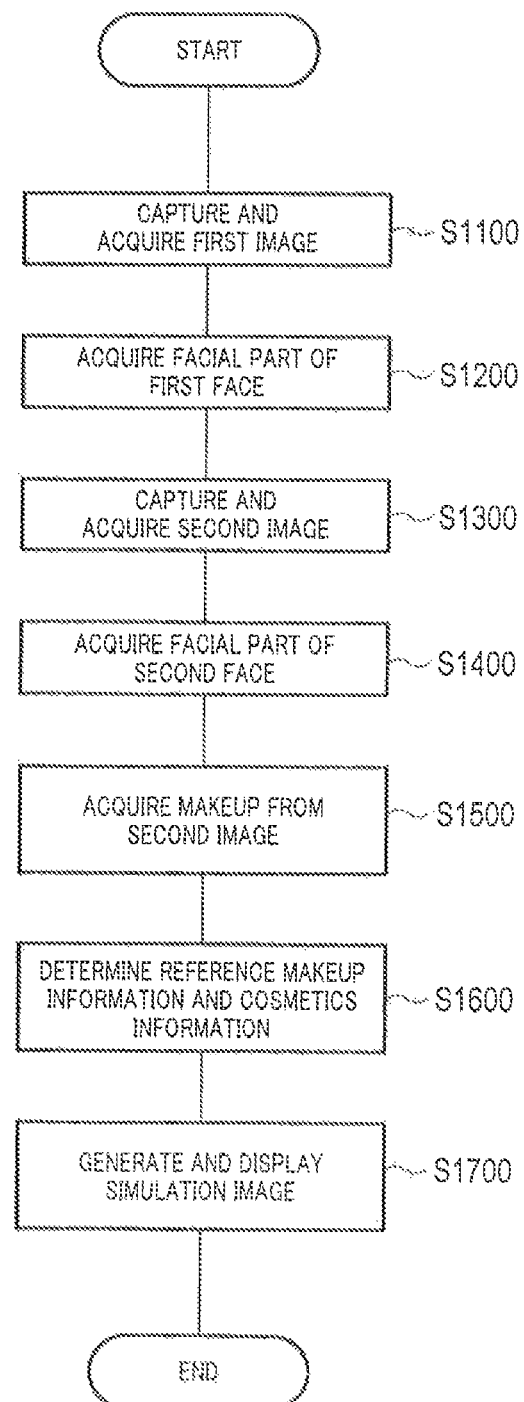
FIG. 6 is a flowchart illustrating exemplary operation of the makeup assisting apparatus according to Embodiment 2.

FIG. 6 is a flowchart illustrating an example of the operation of makeup assisting apparatus 100. Makeup assisting apparatus 100 executes the process illustrated in FIG. 6 every time it is instructed by the user to start generating the simulation image, for example, through operation to the display with the touch panel.

First, in step S1100, first image acquiring section 120 captures an image of the face of the user (a first face) at capturing section 110 and acquires a user image (a first image).

Figure 7:
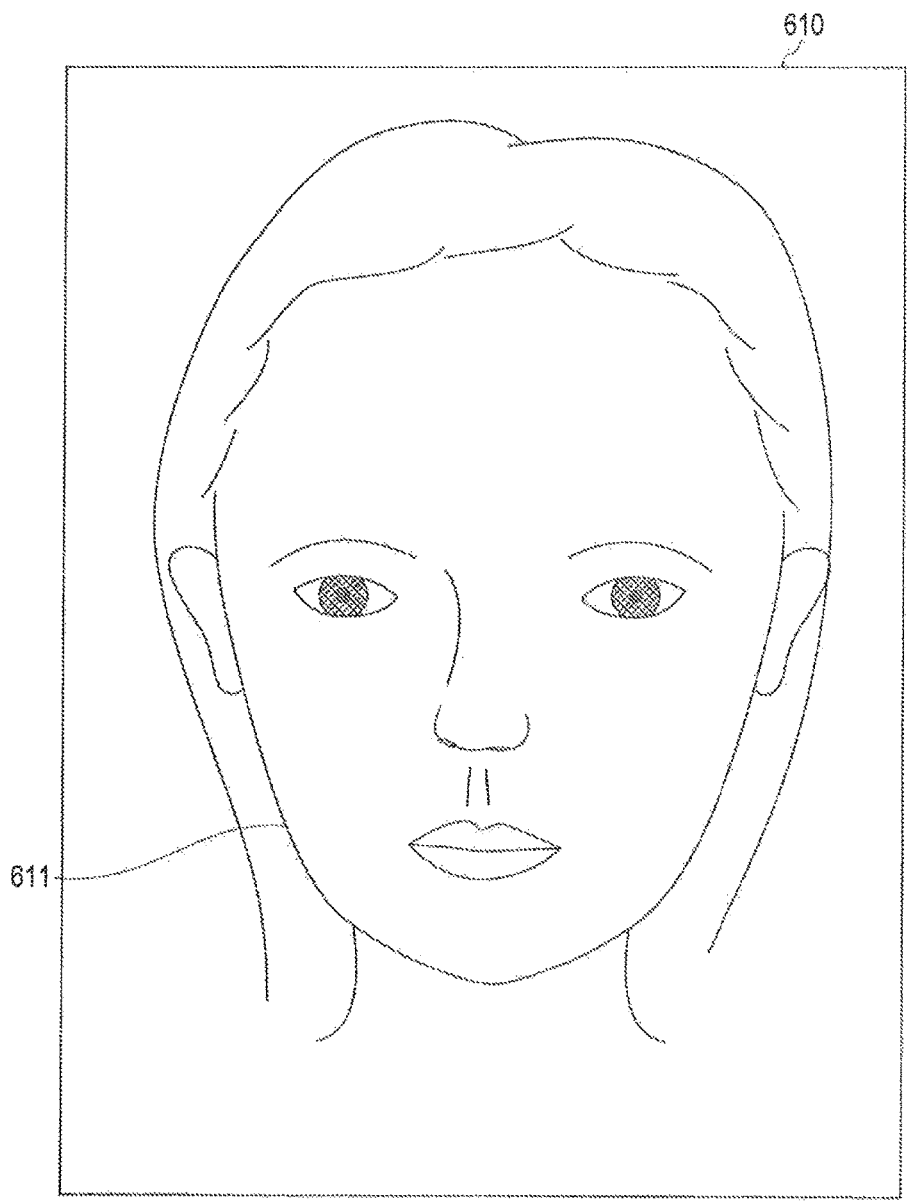
FIG. 7 illustrates an example of a user image in Embodiment 2.

FIG. 7 illustrates an example of the user image acquired in step S1100 of FIG. 6.

As illustrated in FIG. 7, user image 610 includes image 611 of the face (hereinafter, referred to as a "face image") of the user. It is assumed that the user does not put on makeup.

In step S1200 of FIG. 6, first facial part acquiring section 130 acquires facial parts of the face of the user (the first face) from user image 610. At this time, first facial part acquiring section 130 extracts feature points (of the facial parts) of the face from user image 610, for example, by analyzing user image 610. First facial part acquiring section 130 then acquires an area formed by the feature points constituting the same facial part as an area of the facial part. First facial part acquiring section 130 generates user facial part information from the acquired area of the facial part.

Figure 8:
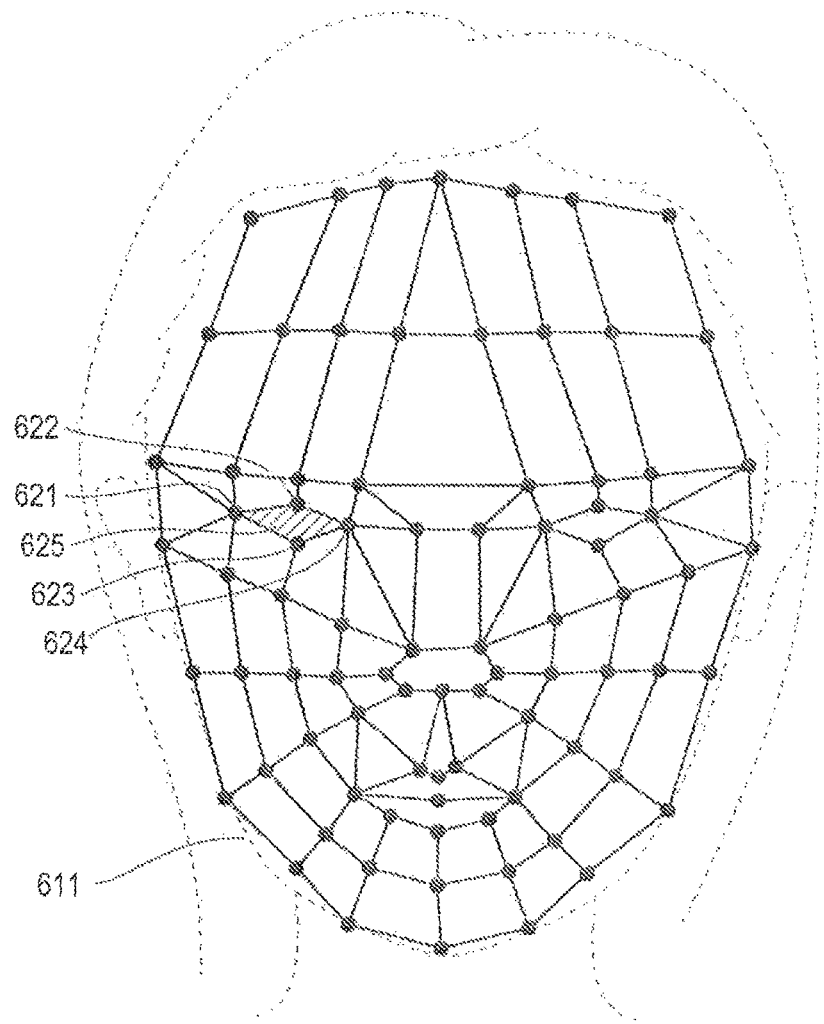
FIG. 8 illustrates an example of placement of feature points of the face in Embodiment 2.

FIG. 8 illustrates an example of arrangement of the feature points of the face extracted in step S1200 of FIG. 6.

As illustrated in FIG. 8, a plurality of feature points (expressed with a symbol "●") are extracted from face image 611. For example, first to fourth feature points 621 to 624 constitute the right eye. Therefore, first facial part acquiring section 130 acquires area 625 enclosed by first to fourth feature points 621 to 624 as an area of the right eye.

Figure 9:
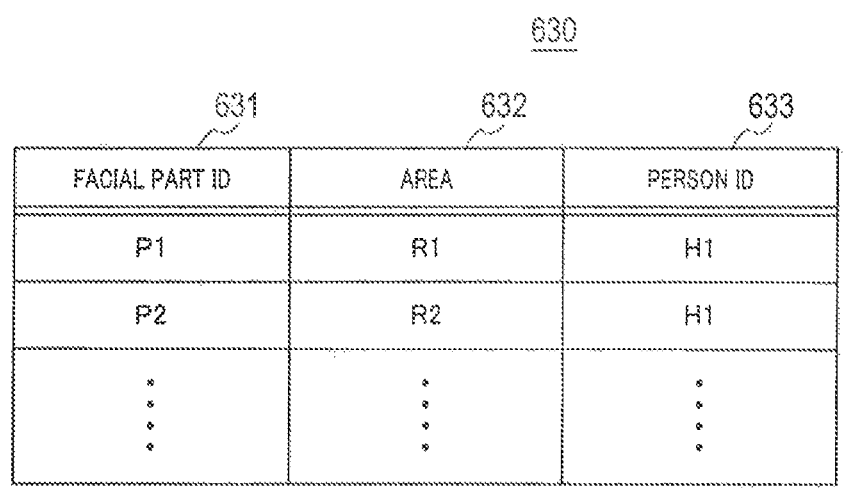
FIG. 9 illustrates an example of user facial part information in Embodiment 2.

FIG. 9 illustrates an example of the user facial part information generated in step S1200 of FIG. 6.

As illustrated in FIG. 9, user facial part information 630, for example, describes area 632 and person ID 633 for each facial part ID 631. Area 632 is information indicating a range of the area of the facial part in the image, and is, for example, a coordinate value list of a coordinate system set on the image. As person ID 633, for example, a value designated by the user through operation to the display with the touch panel is set every time capturing is started.

In step S1300 of FIG. 6, second image acquiring section 140 captures an image of the face of a model (a second face) at capturing section 110 and acquires a model image (a second image).

Figure 10:
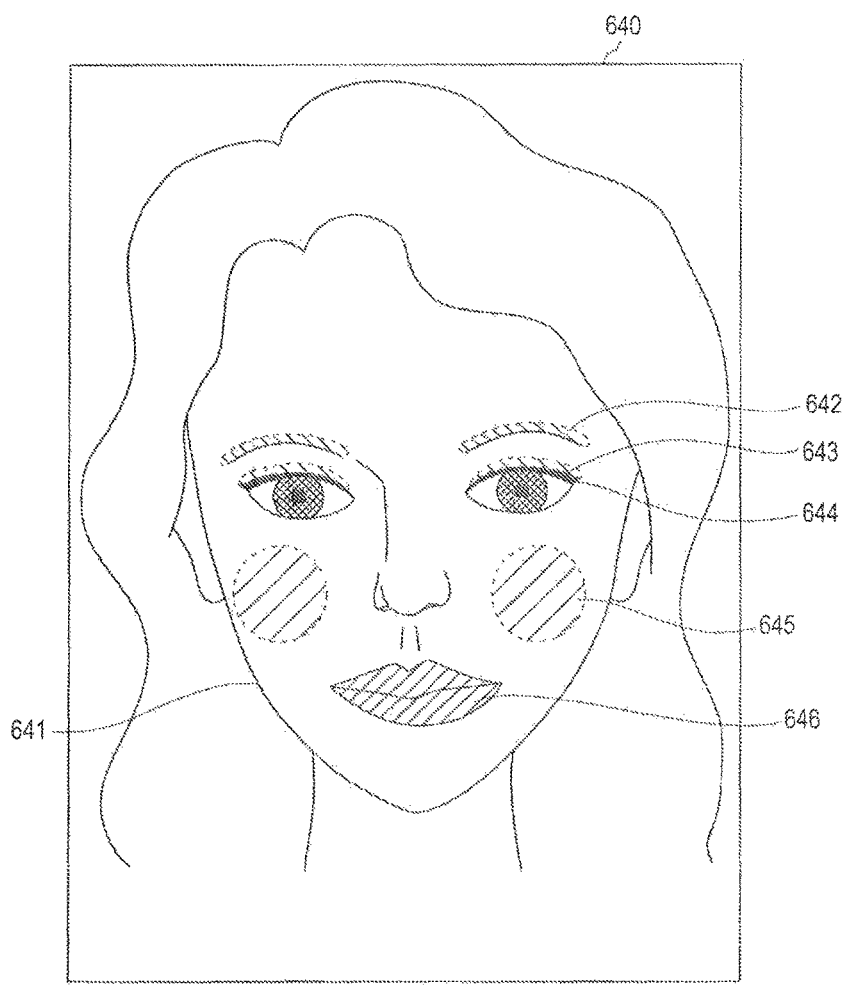
FIG. 10 illustrates an example of a model image in Embodiment 2.

FIG. 10 illustrates an example of the model image acquired in step S1300 of FIG. 6.

As illustrated in FIG. 10, model image 640 includes face image 641 of the model. It is assumed that eyebrow 642, eye shadow 643, eye liner 644, blush 645 and lipstick 646 are applied to the face of the model.

In step S1400 of FIG. 6, second facial part acquiring section 150 acquires a facial part (including the feature points of the face) of the face of the model (the second face) from model image 640 and acquires an area of the facial part. Second facial part acquiring section 150 then generates model facial part information from the acquired area of the facial part. These processes are the same as the processes described in step S1200. Further, the configuration of the model facial part information is the same as the configuration of the user facial part information.

In step S1500, reference makeup acquiring section 170 acquires makeup applied to the face of the model from model image 640 (the second image). Specifically, reference makeup acquiring section 170 acquires makeup for each facial part from model image 640 and the model facial part information with reference to the makeup information stored in makeup information storing section 160. Further, reference makeup acquiring section 170 outputs the reference makeup information indicating the acquired makeup and cosmetics information corresponding to the acquired makeup to makeup presenting section 180.

FIG. 11 illustrates an example of the reference makeup information.

As illustrated in FIG. 11, reference makeup information 650 describes, for example, color 652, concentration 653 and range 654 in association with facial part ID 651.

Color 652, which is illustrated in a simplified manner in FIG. 11, specifically includes an RGB value, a gloss level, and the like. Concentration 653 which is illustrated in a simplified manner in FIG. 11, specifically includes a level of permeability, the way of gradation, and the like when an image is superimposed on the facial image. Range 654, which is illustrated in a simplified manner in FIG. 11, specifically includes a relative coordinate group from the feature points of the face, a set of a relative position of a central point with respect to the feature points and a radius, and the like. That is, a set of color 652, concentration 653 and range 654 includes at least information required for forming an image of makeup.

It should be noted that reference makeup information 650 may further describe an application pattern of the skin cosmetics. The application pattern of the skin cosmetics is, for example, information indicating a relative range with respect to the facial part, such as eye holes, eye lines, portions below the eyes, or the like in the case of eye shadow.

In step S1600 of FIG. 6, makeup presenting section 180 generates a simulation image based on the user image and the reference makeup information, and causes display section 190 to display the simulation image. At this time, makeup presenting section 180 causes display section 190 also to display the cosmetics information.

Figure 12:
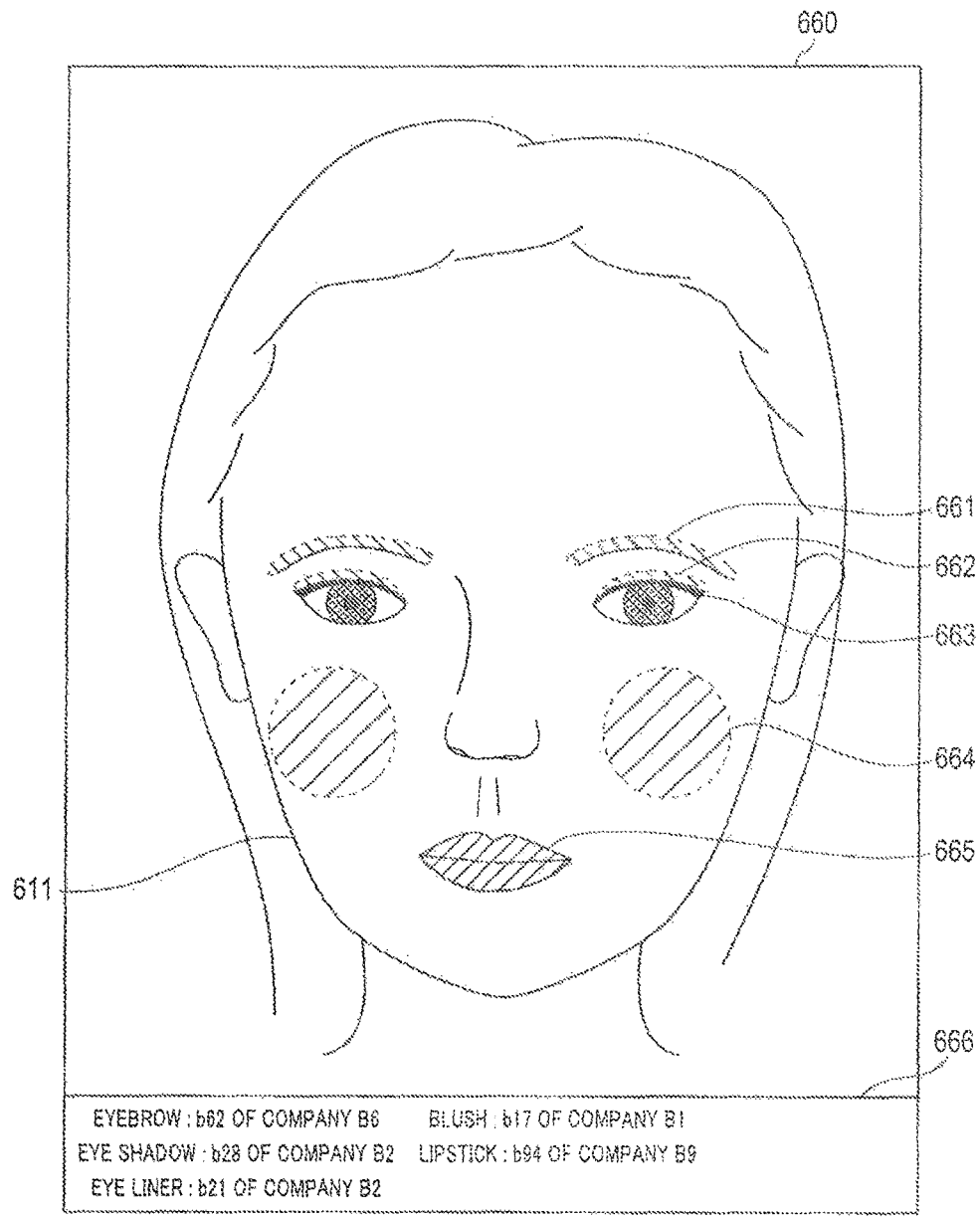
FIG. 12 illustrates an example of a simulation image in Embodiment 2.

FIG. 12 illustrates an example of the simulation image displayed in step S1600 of FIG. 6.

As illustrated in FIG. 12, simulation image 660 is an image obtained by superimposing images 661 to 665 of makeup for the face such as eyebrow, eye shadow, eye liner, blush and lipstick, on face image 611.

Further, information display area 666 which indicates the cosmetics information is added to simulation image 660. That is, in simulation image 660, the cosmetics information of the skin cosmetics required for applying the makeup indicated by the reference makeup information is also displayed. If the user likes makeup shown in the displayed simulation image 660, the user can get required skin cosmetics based on the displayed cosmetics information and can easily put on her makeup actually.

Through the above-described operation, makeup assisting apparatus 100 can display a simulation image in which makeup similar to the makeup applied to the face of others has been applied to the face of the user.

Effect of the Present Embodiment

As described above, makeup assisting apparatus 100 according to the present embodiment can present to the user a simulation image for makeup applied to the face of others without the need for the makeup being specified or input by the user. Therefore, makeup assisting apparatus 100 can appropriately provide assistance for makeup using makeup used by others as a reference.

<Other Makeup Acquiring Method>

It should be noted that reference makeup acquiring section 170 may acquire an image captured by an apparatus other than makeup assisting apparatus 100 as a user image or a model image. In this case, for example, it is only necessary to provide a communication circuit for connecting to a public network such as the Internet at makeup assisting apparatus 100, and reference makeup acquiring section 170 only has to acquire a required image through the communication circuit.

Further, reference makeup acquiring section 170 may acquire information of color and concentration in makeup from sources other than actual color and concentration in the model image. For example, there is a case where information relating to the cosmetics used by the model is provided using a two-dimensional code such as text and QR code (trademark) on the same page as the page of the picture of the face of the model. In such a case, reference makeup acquiring section 170 only has to extract the information from the captured image of the page, specify the cosmetics and specify the color from the above-described makeup information. Further, there is a case where standard concentration can be estimated from the cosmetics. In such a case, reference makeup acquiring section 170 only has to estimate concentration from the specified cosmetics with reference to a table which describes standard concentration for each cosmetic.

Further, reference makeup acquiring section 170 may further acquire an image of the face of the model with no makeup on and acquire makeup of the face of the model based on a difference between the image of the face with no makeup on and the image of the face with makeup on.

<Mapping of Face Image and Makeup>

While a case has been described in the present embodiment where an image of the face captured from the front is used as the user image and the model image, the present invention is not limited to this. For example, if first image acquiring section 120 and first facial part acquiring section 130 acquire an image of the face captured from an oblique direction, first image acquiring section 120 and first facial part acquiring section 130 may map the face image to a stereoscopic shape of the face by employing a publicly known image mapping technique and generate an image of the face seen from the front. It should be noted that the stereoscopic shape of the face used for mapping may be a standard stereoscopic shape of the face or a stereoscopic shape acquired from a stereo image based on the stereo image or the like.

Further, makeup assisting apparatus 100 may generate and display an image of the face captured from a direction other than the front. For example, first facial part acquiring section 130 and second facial part acquiring section 150 associate a two-dimensional coordinate system in the image with a three-dimensional coordinate system in the stereoscopic shape of the face based on the feature points of the face. Reference makeup acquiring section 170 acquires makeup using the above-described three-dimensional coordinate system and maps the acquired makeup to the above-described two-dimensional coordinate system based on the above-described association.

<Removal of Makeup>

While a case has been assumed in the present embodiment where no makeup is applied to the face of the user included in the user image, the present invention is not limited to this. For example, if makeup has been applied to the face of the user included in the user image, first image acquiring section 120 may generate a makeup removed image which is an image of the face of the user without makeup from the user image using a publicly known image processing technique (see, for example, PTL 4). In this case, makeup presenting section 180 only has to generate a simulation image obtained by superimposing an image indicating a state where makeup is applied to the face of the user on the makeup removed image, and present the generated simulation image.

<Application of Cosmetics Information>

Further, makeup assisting apparatus 100 may associate link information to a web site where the user can purchase the skin cosmetics with the displayed cosmetics information. In this case, when the user performs operation to determine the makeup, makeup assisting apparatus 100 can display the corresponding website through a communication network, so that makeup assisting apparatus 100 can provide assistance for makeup more effectively. Further, it is possible to promote sales of cosmetics for cosmetics companies.

<Other Information to be Presented>

Further, makeup assisting apparatus 100 may generate and display a simulation image of the face for which makeup has been halfway finished instead of the simulation image of the face for which all the makeup has been applied. Further, if an application order is set for each makeup as described above, makeup assisting apparatus 100 may sequentially generate and display simulation images of the face for which makeup has been halfway finished according to the application order. Accordingly, makeup assisting apparatus 100 can present to the user an appropriate order of the makeup.

Further, makeup assisting apparatus 100 may present association with the area of the selected makeup and color and concentration of the selected makeup using text. This text is, for example, "apply blush of item number b55 of company B1 heavily to ranges with a diameter of about 4 cm centering around the highest points of the both cheekbones." or the like. Some users can imagine the face to which makeup has been applied only from the text information. It is possible to sufficiently assist such users to apply makeup even with such a presenting method. By this means, makeup assisting apparatus 100 can provide assistance for makeup without generating and displaying an image.

<Other Makeup Presenting Method>

Further, makeup assisting apparatus 100 may present makeup by means of a method other than the method using a simulation image.

For example, makeup assisting apparatus 100 is connected to a printer which transfers a cosmetic agent of the skin cosmetics to a predetermined thin film (a paper-like medium). This thin film holds the transferred cosmetic agent in such a way as to be easily peeled off. Therefore, the cosmetic agent on the thin film is easily transferred to the skin by being pressed against the skin.

Makeup assisting apparatus 100 sets the same shape and area as those of an area in real space of the captured face to the thin film at makeup presenting section 180 and instructs the printer to transfer makeup to the corresponding area. It should be noted that the thin film may be either a planar shape or a steric shape.

Accordingly, makeup assisting apparatus 100 can present to the user makeup on the thin film in association with the corresponding areas.

The user can actually put on the makeup selected based on the simulation image by pressing the entire thin film against the face while aligning positions indicating the corners of the both eyes printed on the thin film to the corners of the both eyes of the user. That is, the user can execute makeup in fashion easily and promptly without applying a cosmetic agent for each facial part.

Further, makeup assisting apparatus 100 may capture a video of the face of the user using a digital video camera, or the like, and generate and display a simulation image in real time for images (frames) included in the captured video. In this case, makeup presenting section 180 only has to sequentially generate simulation images for the respective images included in the video while maintaining makeup indicated by the reference makeup information once input according to the video, and cause display section 190 to display the simulation images.

<Variations with Other Configurations>

Further, a person to which the reference makeup information is to be presented does not necessarily have to be a person of the face (the first face) of the simulation image. Further, the person of the first face does not necessarily have to be different from the person of the second face. The present invention is also suitable for use in a case where, for example, a person desires to reproduce makeup which she applied in the past, but does not remember details of the makeup.

Further, the makeup position table, the makeup color table and the cosmetics table do not necessarily have to be stored in makeup assisting apparatus 100. For example, if makeup assisting apparatus 100 can be connected to a network, makeup assisting apparatus 100 only has to access a server on the network, in which the above-described tables are stored to generate reference makeup information and acquire cosmetics information.

Further, makeup assisting apparatus 100 may be a distributed arrangement system, for example, a system in which, among functional sections illustrated in FIG. 2, only capturing section 110 and display section 190 are disposed at a terminal of the user and the other sections of the apparatus are disposed on a server on the network, or the like.

Further, reference makeup acquiring section 170 may detect outside light and acquire makeup in a state where influence of the outside light is reduced from the image.

Further, the specific items of makeup are not limited to the above-described examples. For example, makeup to be presented includes mascara, lip gloss, and the like.

A makeup assisting apparatus according to this disclosure includes: a first image acquiring section that acquires a first image which is a captured image of a first face; a first facial part acquiring section that acquires an area of a facial part of the first face from the first image; a second image acquiring section that acquires a second image which is a captured image of a second face to which makeup is applied; a second facial part acquiring section that acquires an area of a facial part of the second face from the second image; a reference makeup acquiring section that acquires makeup from the second image for each of the facial parts of the second face based on the area of the facial part of the second face, the makeup being a way of applying the makeup; and a makeup presenting section that presents to a user the acquired makeup in association with the corresponding area of the facial part of the first face.

In the makeup assisting apparatus: the makeup may include at least a color, application concentration and an application range of a skin cosmetic agent; and the reference makeup acquiring section may acquire at least the application range of the makeup based on the area of the facial part of the second face.

In the makeup assisting apparatus: the second facial part acquiring section may acquire a color of skin of the second face from the second image; and the reference makeup acquiring section may acquire the makeup based on the color of the skin.

In the makeup assisting apparatus, the makeup presenting section may generate a simulation image obtained by superimposing, on the first image, an image indicating a state of the makeup when the makeup is applied to the first face, and may present the generated simulation image.

In the makeup assisting apparatus: when makeup is applied to the first face included in the first image, the first image acquiring section may generate a makeup removed image from the first image, the makeup removed image being an image of the first face in a state where no makeup is applied; and the makeup presenting section may generate a simulation image obtained by superimposing, on the makeup removed image, an image indicating a state of the makeup when the makeup is applied to the first face, and may present the generated simulation image.

In the makeup assisting apparatus, the makeup presenting section may further present information relating to a cosmetic required for applying the makeup.

A makeup assisting method according to this disclosure includes: acquiring a first image which is a captured image of a first face; acquiring an area of a facial part of the first face from the first image; acquiring a second image which is a captured image of a second face to which makeup is applied; acquiring an area of a facial part of the second face from the second image; acquiring makeup from the second image for each of the facial parts of the second face based on the area of the facial part of the second face, the makeup being a way of applying the makeup; and presenting to a user the acquired makeup in association with the corresponding area of the facial part of the first face.

A makeup assisting program according to this disclosure is a program causing a computer to execute processing including: acquiring a first image which is a captured image of a first face; acquiring an area of a facial part of the first face from the first image; acquiring a second image which is a captured image of a second face to which makeup is applied; acquiring an area of a facial part of the second face from the second image; acquiring makeup from the second image for each of the facial parts of the second face based on the area of the facial part of the second face, the makeup being a way of applying the makeup; and presenting to a user the acquired makeup in association with the corresponding area of the facial part of the first face.

The disclosure of the specification, drawings, and abstract in Japanese Patent Application No. 2013-018279 filed on Feb. 1, 2013 is incorporated herein by reference in its entirety.

INDUSTRIAL APPLICABILITY

The present invention is useful as a makeup assisting apparatus, a makeup assisting method and a makeup assisting program which can appropriately provide assistance for makeup using makeup used by others as a reference.

REFERENCE SIGNS LIST

100 Makeup assisting apparatus
110 Capturing section
120 First image acquiring section
130 First facial part acquiring section
140 Second image acquiring section
150 Second facial part acquiring section
160 Makeup information storing section 170 Reference makeup acquiring section
180 Makeup presenting section
190 Display section

What is claimed is:

1. A makeup assisting apparatus including a processor that executes instructions and a memory that stores the instructions and configured to:
    acquire a stereo image, which comprises a first image, which is an image obtained by capturing a user's face when the user's face is makeup free and generate a makeup removed image of the user's face from the first image to be used as the first image for subsequent processing when the user's face has makeup thereon, and map, when the first image of the user's face captured from an oblique direction is acquired, the first image to a stereoscopic shape of the user's face to generate a first generated image when the user's face is seen from a front;
    acquire areas of a plurality of portions of the user's face from the first generated image;
    acquire a second image, which is obtained by capturing a model's face, to which makeup is applied and map, when the second image of the model's face captured from an oblique direction is acquired, the second image to a stereoscopic shape of the model's face, to generate a second generated image when the model's face is seen from the front;
    acquire areas of a plurality of portions of the model's face from the second generated image;
    specify an area having a color approximate to a color of a skin of the model's face, from a positional relationship between the areas of the plurality of portions of the model's face;
    estimate, for each of the plurality of portions of the model's face in the second generated image, skin colors of the plurality of portions of the model's face in the second generated image, based on the color of the area specified;
    acquire, from the second generated image, by reverse alpha blending, reference makeup and the color and concentration of the reference makeup including the level of permeability thereof and the gradation thereof for each of the plurality of portions of the model's face, based on differences between the skin colors of the plurality of portions of the second generated image and actual colors of the plurality of portions of the second generated image, the reference makeup including a way of applying the makeup;
    acquire the reference makeup from a two-dimensional code displayed on an image of the model's face in a picture thereof instead of acquiring the reference makeup based on differences between the skin colors of the plurality of portions of the second image and actual colors of the plurality of portions of the second image, when acquiring the second image by capturing a picture of the model's face that includes the two-dimensional code; and
    transfer, with a printer, a cosmetic agent of skin cosmetics required for applying the reference makeup to a peelable predetermined thin film transferable to the user's face when peeled after the printer is connected to the makeup assisting apparatus.

2. The makeup assisting apparatus according to claim 1, wherein the processor is further configured to control a display to display a two-dimensional coordinate system in the first image of the user's face in association with a three-dimensional coordinate system in the stereoscopic shape of the user's face, based on feature points of the user's face, to generate the first generated image of the face.

3. A makeup assisting method for a makeup assisting apparatus comprising:
    acquiring a stereo image, which comprises a first image obtained by capturing a user's face when the user's face is makeup free and generate a makeup removed image of the user's face from the first image to be used as the first image for subsequent processing when the user's face has makeup thereon;
    mapping, when the first image of the user's face captured from an oblique direction is acquired, the first image to a stereoscopic shape of the user's face to generate a first generated image when the user's face is seen from a front;
    acquiring areas of a plurality of portions of the user's face from the first generated image;
    acquiring a second image which is an image obtained by capturing a model's face to which makeup is applied;
    mapping, when the second image of the model's face captured from an oblique direction is acquired, the second image to a stereoscopic shape of the model's face to generate a second generated image when the model's face is seen from the front;
    acquiring areas of a plurality of portions of the model's face from the second generated image;
    specifying an area having a color approximate to a color of a skin of the model's face, from a positional relationship between the areas of the plurality of portions of the model's face;
    estimating, for each of the plurality of portions of the model's face in the second generated image, skin colors of the plurality of portion of the model's face in the second generated image, based on the color of the area specified;
    acquiring, from the second generated image, by reverse alpha blending, reference makeup and the color and concentration of the reference makeup including the level of permeability thereof and the gradation thereof for each of the plurality of portions of the model's face, based on differences between the skin colors of the plurality of portions of the second generated image and actual colors of the plurality of portions of the second generated image, the reference makeup including a way of applying the makeup;
    acquiring the reference makeup from a two-dimensional code displayed on an image of the model's face in a picture thereof instead of acquiring the reference makeup based on differences between the skin colors of the plurality of portions of the second image and actual colors of the plurality of portions of the second image, when acquiring the second image by capturing a picture of the model's face that includes the two-dimensional code;
    transferring, with a printer, a cosmetic agent of skin cosmetics required for applying the reference makeup to a peelable predetermined thin film transferable to the user's face when peeled after the printer is connected to the makeup assisting apparatus.

4. The makeup assisting method according to claim 3, further comprising:
    associating a two-dimensional coordinate system in the image of the user's face with a three-dimensional coordinate system in the stereoscopic shape of the user's face, based on feature points of the user's face, to generate the first generated image of the face; and
    displaying the first generated image.

5. A non-transitory computer-readable storage medium comprising a make-up assisting program for a make-up assisting apparatus that causes a computer to execute processing comprising:
- acquiring a stereo image, which comprises a first image obtained by capturing a user's face when the user's face is makeup free and generate a makeup removed image of the user's face from the first image to be used as the first image for subsequent processing when the user's face has makeup thereon;
- mapping, when the first image of the user's face captured from an oblique direction is acquired, the first image to a stereoscopic shape of the user's face to generate a first generated image when the user's face is seen from a front;
- acquiring areas of a plurality of portions of the user's face from the first generated image;
- acquiring a second image which is an image obtained by capturing a model's face to which makeup is applied;
- mapping, when the second image of the model's face captured from an oblique direction is acquired, the second image to a stereoscopic shape of the model's face to generate a second generated image when the model's face is seen from the front;
- acquiring areas of a plurality of portions of the model's face from the second generated image;
- specifying an area having a color approximate to a color of a skin of the model's face, from a positional relationship between the areas of plurality of portions of the model's face;
- estimating, for each of the plurality of portions of the model's face in the second generated image, skin colors of the plurality of portions of the model's face in the second generated image, based on the color of the area specified;
- acquiring, from the second generated image, by reverse alpha blending, reference makeup and the color and concentration of the reference makeup including the level of permeability thereof and the gradation thereof for each of the plurality of portions of the model's face, based on differences between the skin colors of the plurality of portions of the second generated image and actual colors of the plurality of portions of the second generated image, the reference makeup including a way of applying the makeup;
- acquiring the reference makeup from a two-dimensional code displayed on an image of the model's face in a picture thereof instead of acquiring the reference makeup based on differences between the skin colors of the plurality of portions of the second image and actual colors of the plurality of portions of the second image, when acquiring the second image by capturing a picture of the model's face that includes the two-dimensional code;
- transferring, with a printer, a cosmetic agent of skin cosmetics required for applying the reference makeup to a peelable predetermined thin film transferable to the user's face when peeled after the printer is connected to the makeup assisting apparatus.

6. The non-transitory computer-readable storage medium according to claim 5, the make-up assisting program causing the computer to execute processing further comprising:
- associating a two-dimensional coordinate system in the image of the user's face with a three-dimensional coordinate system in the stereoscopic shape of the user's face based on feature points of the user's face to generate the first generated image of the user's face; and
- displaying the first generated image.

7. The makeup assisting apparatus according to claim 1, wherein the processor further
- generates a simulation image obtained by superimposing, on the first generated image, a state image indicating a state of the reference makeup when the reference makeup acquired from the second generated image is applied to the user's face, and
- control a display to display the simulation image that is generated,
- wherein the simulation image is generated in accordance with Equations 1 to 3:

$$R = r_2 \times \alpha + r_1 \times (1-\alpha) \quad \text{(Equation 1)}$$

$$G = g_2 \times \alpha + g_1 \times (1-\alpha) \quad \text{(Equation 2)}$$

$$B = b_2 \times \alpha + b_1 \times (1-\alpha) \quad \text{(Equation 3)}$$

where
- $r_1$, $g_1$ and $b_1$ are RGB values of an arbitrary area in the first image that is captured,
- $r_2$, $g_2$ and $b_2$ are RGB values of colors of the reference makeup,
- R, G and B are RGB values of a corresponding area in the simulation image, and
- $\alpha$ is set according to a concentration of the reference makeup.

8. The makeup assisting apparatus according to claim 1, wherein when acquiring the reference makeup, the processor is further configured to acquire:
- an application range of the reference makeup.

9. The makeup assisting apparatus according to claim 1, wherein when acquiring the reference makeup, the processor is further configured to determine, for each of the plurality of portions of the model's face, whether the reference makeup on the model's face includes at least one of:
- eye shadow;
- lipstick; and
- blush.

10. The makeup assisting apparatus according to claim 1, wherein the processor further
- generates a simulation image obtained by superimposing, on the first generated image, a state image indicating a state of the reference makeup when the reference makeup acquired from the second generated image is applied to the user's face, and
- control a display to display the simulation image that is generated,
- wherein the processor is further configured to generate the simulation image to include at least one of, eye shadow, lipstick, and blush.

11. The makeup assisting apparatus according to claim 1, wherein the processor is further configured to determine, for each of the plurality of portions of the model's face, whether a portion of the plurality of portions of the model's face has makeup applied thereon when the difference between the estimated skin color of the portion and the actual color of the portion is greater than or equal to a predetermined threshold.

12. The makeup assisting apparatus according to claim 1, wherein the processor further
- generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R=r_2 \times \alpha + r_1 \times (1-\alpha) \quad \text{(Equation 1)}$$

$$G=g_2 \times \alpha + g_1 \times (1-\alpha) \quad \text{(Equation 2)}$$

$$B=b_2 \times \alpha + b_1 \times (1-\alpha) \quad \text{(Equation 3)}$$

where $r_1$, $g_1$ and $b_1$ are RGB values of an arbitrary area in the first image that is captured, $r_2$, $g_2$ and $b_2$ are RGB values of colors of the reference makeup, R, G and B are RGB values of a corresponding area in the simulation image, and $\alpha$ is set according to a concentration of the reference makeup, wherein when acquiring the reference makeup, the processor is further configured to acquire:

an application range of the reference makeup, and wherein the second image is captured using a digital camera.

13. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R=r_2 \times \alpha + r_1 \times (1-\alpha) \quad \text{(Equation 1)}$$

$$G=g_2 \times \alpha + g_1 \times (1-\alpha) \quad \text{(Equation 2)}$$

$$B=b_2 \times \alpha + b_1 \times (1-\alpha) \quad \text{(Equation 3)}$$

where $r_1$, $g_1$ and $b_1$ are RGB values of an arbitrary area in the first image that is captured, $r_2$, $g_2$ and $b_2$ are RGB values of colors of the reference makeup, R, G and B are RGB values of a corresponding area in the simulation image, and $\alpha$ is set according to a concentration of the reference makeup, and wherein when acquiring the reference makeup, the processor is configured to acquire:

an application range of the reference makeup.

14. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R=r_2 \times \alpha + r_1 \times (1-\alpha) \quad \text{(Equation 1)}$$

$$G=g_2 \times \alpha + g_1 \times (1-\alpha) \quad \text{(Equation 2)}$$

$$B=b_2 \times \alpha + b_1 \times (1-\alpha) \quad \text{(Equation 3)}$$

where $r_1$, $g_1$ and $b_1$ are RGB values of an arbitrary area in the first image that is captured, $r_2$, $g_2$ and $b_2$ are RGB values of colors of the reference makeup, R, G and B are RGB values of a corresponding area in the simulation image, and $\alpha$ is set according to a concentration of the reference makeup, wherein when acquiring the reference makeup, the processor is further configured to determine, for each of the plurality of portions of the model's face, whether the reference makeup on the model's face includes at least one of:

eye shadow;

lipstick; and blush.

15. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R=r_2 \times \alpha + r_1 \times (1-\alpha) \quad \text{(Equation 1)}$$

$$G=g_2 \times \alpha + g_1 \times (1-\alpha) \quad \text{(Equation 2)}$$

$$B=b_2 \times \alpha + b_1 \times (1-\alpha) \quad \text{(Equation 3)}$$

where $r_1$, $g_1$ and $b_1$ are RGB values of an arbitrary area in the first image that is captured, $r_2$, $g_2$ and $b_2$ are RGB values of colors of the reference makeup, R, G and B are RGB values of a corresponding area in the simulation image, and $\alpha$ is set according to a concentration of the reference makeup, wherein when acquiring the reference makeup, the processor is further configured to determine, for each of the plurality of portions of the model's face, whether the reference makeup on the model's face includes at least one of:

eye shadow;

lipstick; and blush, and wherein the processor is further configured to generate the simulation image to include at least one of eye shadow, lipstick, and blush.

16. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R = r_2 \times \alpha + r_1 \times (1-\alpha) \quad \text{(Equation 1)}$$

$$G = g_2 \times \alpha + g_1 \times (1-\alpha) \quad \text{(Equation 2)}$$

$$B = b_2 \times \alpha + b_1 \times (1-\alpha) \quad \text{(Equation 3)}$$

where
- $r_1$, $g_1$ and $b_1$ are RGB values of an arbitrary area in the first image that is captured,
- $r_2$, $g_2$ and $b_2$ are RGB values of colors of the reference makeup,
- R, G and B are RGB values of a corresponding area in the simulation image, and
- $\alpha$ is set according to a concentration of the reference makeup, wherein the processor is further configured to determine, for each of the plurality of portions of the model's face, whether a portion of the plurality of portions of the model's face has makeup applied thereon when the difference between the estimated skin color of the portion and the actual color of the portion is greater than or equal to a predetermined threshold.

17. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R = r_2 \times \alpha + r_1 \times (1-\alpha) \quad \text{(Equation 1)}$$

$$G = g_2 \times \alpha + g_1 \times (1-\alpha) \quad \text{(Equation 2)}$$

$$B = b_2 \times \alpha + b_1 \times (1-\alpha) \quad \text{(Equation 3)}$$

where
- $r_1$, $g_1$ and $b_1$ are RGB values of an arbitrary area in the first image that is captured,
- $r_2$, $g_2$ and $b_2$ are RGB values of colors of the reference makeup,
- R, G and B are RGB values of a corresponding area in the simulation image, and
- $\alpha$ is set according to a concentration of the reference makeup, and wherein the second image is captured using a digital camera.

18. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R = r_2 \times \alpha + r_1 \times (1-\alpha) \quad \text{(Equation 1)}$$

$$G = g_2 \times \alpha + g_1 \times (1-\alpha) \quad \text{(Equation 2)}$$

$$B = b_2 \times \alpha + b_1 \times (1-\alpha) \quad \text{(Equation 3)}$$

where
- $r_1$, $g_1$ and $b_1$ are RGB values of an arbitrary area in the first image that is captured,
- $r_2$, $g_2$ and $b_2$ are RGB values of colors of the reference makeup,
- R, G and B are RGB values of a corresponding area in the simulation image, and
- $\alpha$ is set according to a concentration of the reference makeup, wherein when acquiring the reference makeup, the processor is further configured to determine, for each of the plurality of portions of the model's face, whether the reference makeup on the model's face includes at least one of:
- eye shadow;
- lipstick; and
- blush, wherein the processor is further configured to generate the simulation image to include at least one of eye shadow, lipstick, and blush, and wherein the second image is captured using a digital camera.

19. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the simulation image is generated in accordance with Equations 1 to 3:

$$R = r_2 \times \alpha + r_1 \times (1-\alpha) \quad \text{(Equation 1)}$$

$$G = g_2 \times \alpha + g_1 \times (1-\alpha) \quad \text{(Equation 2)}$$

$$B = b_2 \times \alpha + b_1 \times (1-\alpha) \quad \text{(Equation 3)}$$

where
- $r_1$, $g_1$ and $b_1$ are RGB values of an arbitrary area in the first image that is captured,
- $r_2$, $g_2$ and $b_2$ are RGB values of colors of the reference makeup,
- R, G and B are RGB values of a corresponding area in the simulation image, and
- $\alpha$ is set according to a concentration of the reference makeup, wherein when acquiring the reference makeup, the processor is further configured to acquire:
an application range of the reference makeup, wherein when acquiring the reference makeup, the processor is further configured to determine, for each of the plurality of portions of the model's face, whether the reference makeup on the model's face includes at least one of:
- eye shadow;
- lipstick; and
- blush, wherein the processor is further configured to generate the simulation image to include at least one of eye shadow, lipstick, and blush, wherein the second image is captured using a digital camera, and wherein the processor is further configured to determine, for each of the plurality of portions of the model's face, whether a portion of the plurality of portions of the model's face has makeup applied thereon when the difference between the estimated skin color of the portion and the actual color of the portion is greater than or equal to a predetermined threshold.

20. The makeup assisting apparatus according to claim 1, wherein the processor further generates a simulation image obtained by superimposing, on the first generated image, a state image indicating a state of the reference makeup when the reference makeup acquired from the second generated image is applied to the user's face, and control a display to display the simulation image that is generated, wherein the reference-makeup acquiring operation also acquires:

an application range of the reference makeup, wherein when acquiring the reference makeup, the processor is further configured to determine, for each of the plurality of portions of the model's face, whether the reference makeup on the model's face includes at least one of:

eye shadow;

lipstick; and blush, wherein the processor is further configured to generate the simulation image to include at least one of eye shadow, lipstick, and blush, wherein the second image is captured using a digital camera, and wherein the processor is further configured to determine whether, for each of the plurality of portions of the model's face, whether a portion of the plurality of portions of the model's face has makeup applied thereon when the difference between the estimated skin color of the portion and the actual color of the portion is greater than or equal to a predetermined threshold.

* * * * *